United States Patent [19]

Ott

[11] 4,041,378
[45] Aug. 9, 1977

[54] INTERCHANGEABLE PROBE TIP FOR A MAGNETIC THICKNESS GAUGE

[76] Inventor: Albert Ott, Sindelfingerstrasse 118 BRD, 7032 Sindelfingen, Germany

[21] Appl. No.: 650,902

[22] Filed: Jan. 21, 1976

[30] Foreign Application Priority Data

Dec. 13, 1975 Germany .............................. 2556340

[51] Int. Cl.² ............................................. G01R 33/12
[52] U.S. Cl. ................................................ 324/34 TK
[58] Field of Search .................. 324/34 R, 34 TK, 40

[56] References Cited

U.S. PATENT DOCUMENTS

| | | | |
|---|---|---|---|
| 2,221,516 | 11/1940 | Hathaway | 324/34 TK |
| 2,903,645 | 9/1957 | Wright et al. | 324/34 TK |
| 2,933,677 | 4/1960 | Lieber | 324/34 TK |

*Primary Examiner*—Robert J. Corcoran

[57] ABSTRACT

An interchangeable end piece for fastening to the front surfaces of a soft-iron magnetic yoke of a measuring probe which measuring probe is used for measuring the thickness of thin non-ferromagnetic layers on a ferromagnetic base comprising a pin element having a headplate, a contact piece welded to the headplate which contact piece is made from a mass-produced, high-precision steel element having a contact surface with a single radius of curvature, the radial angle of the contact surface, measured from the center of the underside of the contact piece, is much smaller than 90°, the surface of the contact piece outside the radial angle range is depressed, the maximum surface described by the radial angle is much smaller than the cross-sectional area of the pin element up to the rim of the underside of the contact piece.

7 Claims, 8 Drawing Figures

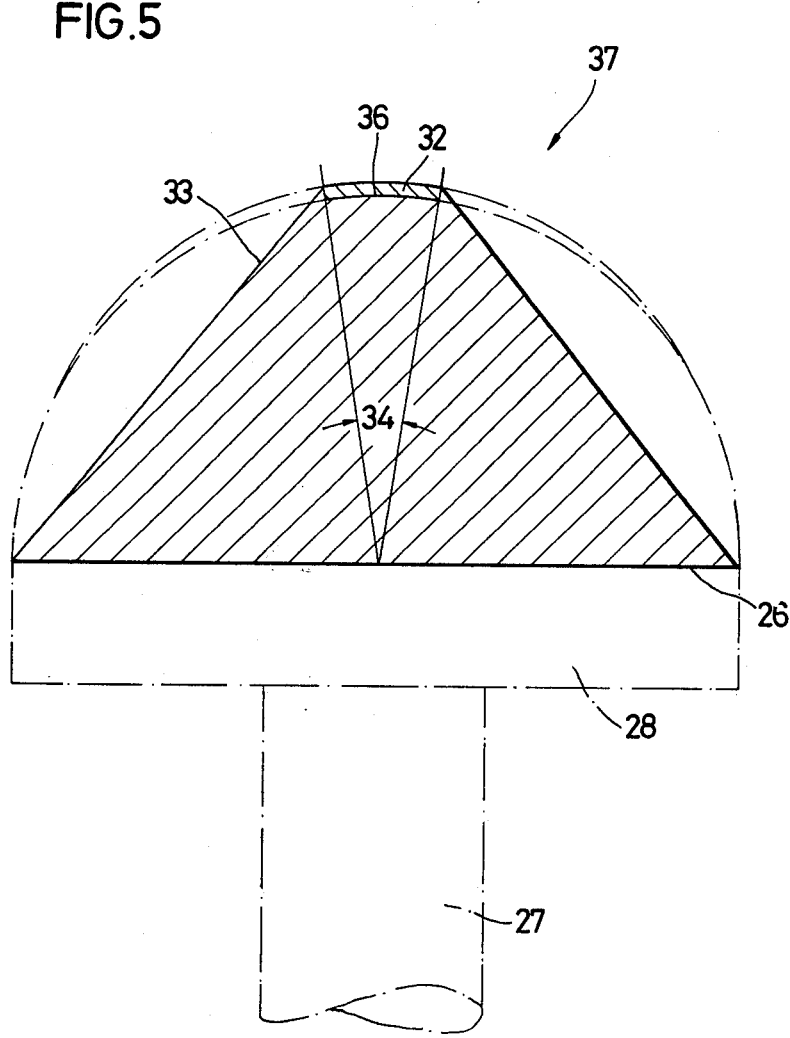

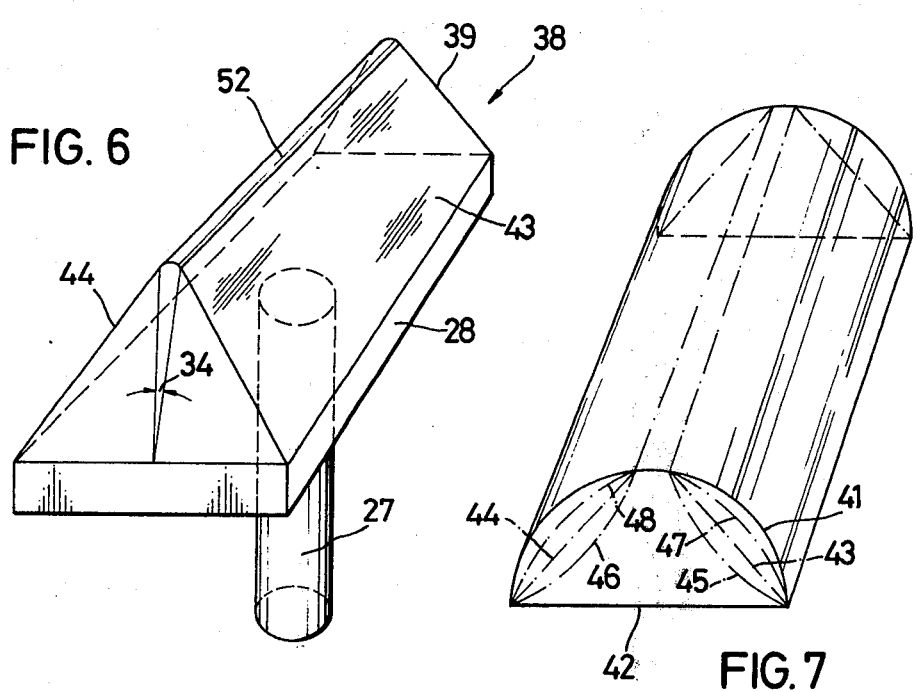
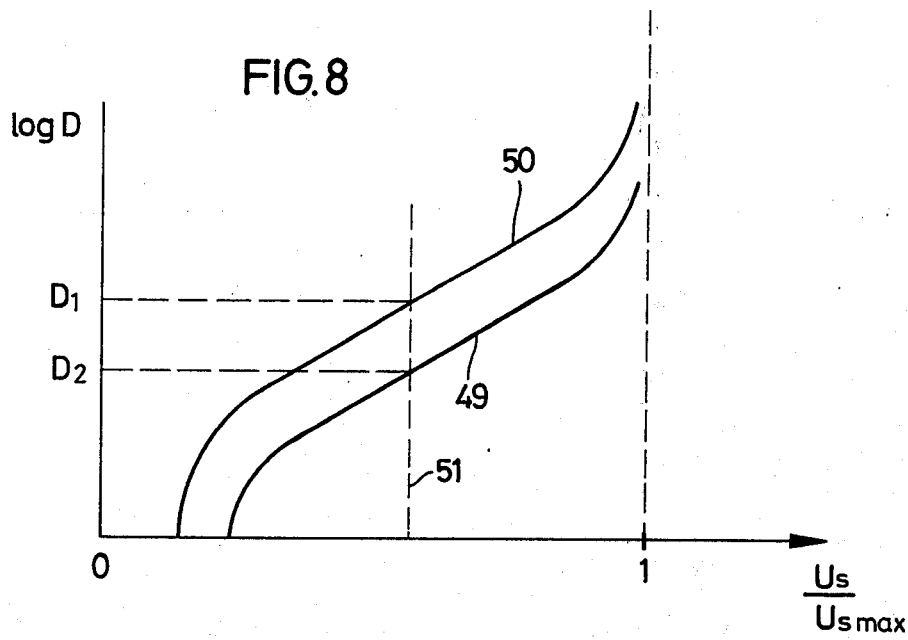

INTERCHANGEABLE PROBE TIP FOR A MAGNETIC THICKNESS GAUGE

The present invention relates to an interchangeable end piece for fastening to the front surfaces of a soft-iron magnetic yoke of a measuring probe which measuring probe is used fo measuring the thickness of thin non-ferromagnetic layers on a ferromagnetic base, with the end piece comprising a pin element, a headplate and a contact piece welded to the headplate which contact piece is made from a mass-produced but high-precision design steel design element which element has outside surfaces with only one radius of curvature.

BACKGROUND OF THE INVENTION

Such measuring probes are required for measuring the thickness of layers in the hard-to-reach areas of workpieces. For example, measurements must be taken at the bottom of gear teeth surfaces or at the bottom of threads of in U-shaped grooves. The probe must indicate the correct voltages even when the probe is not completely perpendicular to the layer.

From the German Utility Pat. No. 7,336,864 it is known how to use a ball-bearing ball, half of which has been ground off, on the front surfaces of the magnetic yoke of a probe. Inside a very large solid angle, owing to the point (radial) symmetry of a spherical surface, the probe can be placed at an angle. Nevertheless, one obtains the same measurement result as when placing the probe perpendicularly.

However, if one wishes to measure at hard-to-reach spots, one would have to use very much smaller hemispheres than when measuring on plane sheet metal or other plane surfaces. If one progressively reduces the size of the system described in the German utility patent, the curvature of the surface on which the measurement is made plays a progressively smaller part. However, if one reduces the entire measuring system linearly, the output voltages become progressively smaller and one reaches the area of noise or catches interference voltages coming from the industrial plant or from medium-wave transmitters, because such probes operate in the same frequency range as medium-wave transmitters.

It is, therefore, an object of the present invention to create a probe with which one can measure on surfaces of small radius of curvature and with which one obtains output voltages which are of the order of magnitude conventional with mesuring probes and where there is no danger that interference voltages predominate. However, this object must be realized at minimum cost and measuring personnel must not be expected to require considerable retraining incomparison with the previous measuring method.

SUMMARY OF THE INVENTION

The objects of the present invention are achieved as follows:
  a. The radial angle, measured from the center of the underside of the contact piece, is much smaller than 90°.
  b. The outside surface of the contact piece outside the radial range is a depressed surface.
  c. The maximum surface described by the radial angle is much smaller than the cross-sectional surface of the pin element up to the rim of the underside.

As used in the specification, the term "depressed" means that the surface of the contact piece outside the radial angle is set back below the extension of the cylindrical or ball-shaped contour of the contact surface within the radial angle. Surprisingly, through this shape of the design element, the probe becomes even more sensitive than with the system in accordance with the German Utility Pat. No. 7,336,864. The contact piece can be a ball-bearing ball spherical section which is pointed like a pencil point. As a result of this improvement the manufacture starts with a highly precise and very inexpensive design element which is obtainable everywhere, if the contact piece is to have a spherical surface.

The contact piece can be an axially cut cylinder which is pointed like the edge of a wedge. As a result of this improvement the invention can also be used in those cases where the measurements are to be made by means of cylinder surfaces instead of spherical surfaces.

The cylinder can be a roller-bearing cylinder. As a result of this improvement one can start with a highly precise and inexpensive design element which is easily obtainable, not only because of the shape, but also because of the structure and the weldability of roller-bearing components.

The cylinder can be a precision rod. As a result of this improvement one can also start with precision rollers which are easily obtainable, quite inexpensive and precise.

The radial angle range has a layer of a hard, wear-resistant carbide which cannot be decomposed by water and diluted acids and which has a layer thickness of several microns. As used in this specification, the term "radial angle range" refers to the contact surface portion of the probe tip, within a radial angle measured from the center of the underside of the contact piece. It is the portion the cylindrical or ball-shaped contact piece within the radial angle. As a result of this improvement the probe permits measurement on workpieces of small radius and one is free of the permeability properties of the carrier layer. In addition, owing to this improvement, the measuring characteristic can again be shifted to "insensitive." This is desirable when certain layer thicknesses are to be measured and the measuring points must be located in the linear section of the logarithmic characteristic curve. In addition, higher wear resistance is obtained.

The carbide is titanium carbide. As a result of this improvement one obtains a carbide which can be mounted with special precision, special adhesion and at low cost on the design element.

The novel features which are considered as characteristic for the invention are set forth in particular in the appended claims. The invention itself, however, both as to its construction and its method of operation, together with additional objects and advantages thereof, will be best understood from the following description of specific emb diments when read in connection with the accompanying drawings.

BRIEF DESCRIPTION OF THE DRAWINGS

FIG. 5 shows a still further enlarged section thrugh a layer-coated hemisphere with a pencil point;

FIG. 6 shows a finished probe tip of a second embodiment;

FIG. 7 shows a perspective view of an axially cut cylinder and indications along which planes wedge-shaped points may be produced; and FIG. 8 shows a graphic representation (curve) of the relationship between layer thickness and induced probe voltage $U_s$ in normalized and log-log plotting.

DESCRIPTION OF THE PREFERRED EMBODIMENTS

Figure 1:
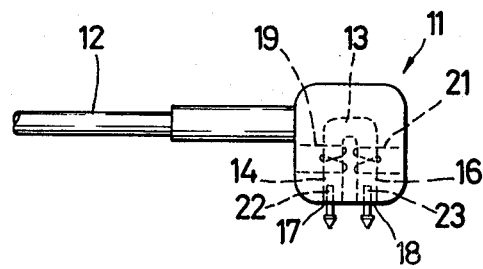
FIG. 1 is a side view of a measuring probe with the probe tips not screwed in all the way.
Figure 2:
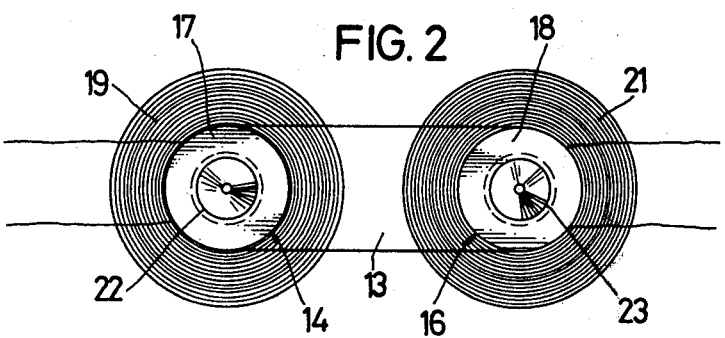
FIG. 2 is a top view of the front surfaces of a wound U magnet core without probe tips.

Referring to FIg. 1, a supply cable 12 leads to a measuring probe 11. The measuring probe is shown in actual size and has two poles. In accordance with the present invention, a single-pole measuring probe is sufficient. A U magnet core 13 is cast integral with the measuring probe 11. This core has two parallel legs 14, 16 whose front surfaces 17, 18 are visible from the outside and are not covered. The leg 14 mounts an exciting coil 19, while leg 16 mounts an induction coil 21 whose ends are connected to supply cable 12. Each leg 14, 16 has a blind-end bore 22, 23 which is about 4 mm long and starts in the front surface 17, 18. The front surface 17, 18 is plane.

From a ball-bearing ball of about 2 mm diameter, half is ground off so that there remains hemisphere 24 whose ground surface 26 is plane by definition. Such ball-bearing balls represent ferromagnetic bodies which are very wear-resistant and have a precise spherical geometry. Their outside surface is harder than the tougher core.

A circle-cylindrical shaft 27 of several millimeters length mounts a circular-disc shaped plate 28. The topside 29 of plate 28 has a little cone 31. To connect the two parts, in accordance with electric welding procedure, the shaft 27 is connected to a negative potential and the hemisphere 24 is connected to a positive potential of sufficient megnitude. If hemisphere 24 is pressed against topside 29, cone 31 merges with hemispheres 24. Hemisphere 24 is pressed against plate 28 until there is practically no gap between ground surface 26 and topside 29. During this process, only the core of hemisphere 24 heats up appreciably and the heat generated is localized to a very small region. Nevertheless, the connection between the hemisphere 24 and the plate 28 is excellent, both magnetically and mechanically. No harmful recrystalization takes place in the outer skin of hemisphere 24.

On hemisphere 24, a cap 32, made of titanium carbide, is attached by gas diffusion. In the vicinity of the pole, this cap has a thickness of 2 to 15 microns which is controllable by the coating process and its thickness decreases towards the sides, as shown exaggerated in FIG. 5. Now the hemisphere 24 is ground to form a truncated cone, down to the outside surface 33. According to FIG. 5, this outside surface 33 is precisely a circular conic surface. However, in deviation from the drawing, the outside surface 33 may be slightly concave or slightly convex. However, it is important that considerable amounts of material are removed by this grinding process. The radial angle 34 is between 5° and 20°. The spherical surface 36 circumscribed by this radial angle 34 is very much smaller than the cross section of plate 28 and also smaller than the cross section of shaft 27, measured perpendicular to the plane of the drawing of FIG. 5. During grinding, one may clamp the probe tip 37 on shaft 27.

To the extent that certain effects, to be described later, are desirable or undesirable, the cap 32 may be omitted and one may start with an uncoated hemisphere 24.

Furthermore, it is possible first to grind the still uncoated hemisphere 24 and then to apply the carbide coat. In this case, a coat is deposited on outside surface 33, which results in neither benefit nor disadvantage.

The probe tip 38 in accordance with FIG. 6 has a shaft 27 which turns into a plate 28 which, in contrast to the previous case, has a flat shape. Component 39 is made from a rolling-bearing cylinder 41 which was ground radially along a plane surface 42. Then, the halved cylinder 41, as mentioned above, was welded to the plate 28 and then it was ground down to the outside surfaces 43, 44. The grinding may also lead to concave surfaces 45, 46 or to convex surfaces 48, 47. Again, it is important that considerable amounts of material are removed and that a radial angle 34 between 5° and 20° remains unground. The remaining cylinder surface 52 may be coated with carbide or may be uncoated.

This considerable removal of material results in the surface curvature of the object to be measured hardly or no longer playing any part. It is not necessary to microminiaturize as much as per se would be required. Also, more difficult handling would result from microminiaturization.

Surprisingly, the relative change in measuring voltage produced at the output of the induction coil 28 for a certain layer thickness is greater than it would be if one would not grind the hemisphere 24 or the cylinder 41, i.e. the system has become more sensitive.

It is even more surprising that the results of the measurements, carried out with the probe tips according to the invention, are highly independent of the permeability of the "carrier layer." Deep drawing sheet metal, alloyed steel or hardened steel as carrier material have different permeabilities. These result in system errors which must be corrected. Formerly, this had to be taken into consideration during measurement. However, as the result of designing the contact piece in accordance with the present invention, the indicated layer thickness becomes less dependent on the permeability of the carrier material.

FIG. 8 shows the relationship between the layer thickness D and the induced voltage $U_s$. Let us assume that we measure with nonpointed probe tips 37, 38, along a curve 50. If one points the probe tips 37, 38 in the manner described, one obtains curve 49. The system has become more sensitive for measuring thin layers. With a layer thickness D1 of a thicker layer, one obtains precisely the same voltage $U_s$ as with a thinner layer D2. This applies to those cases where no coating (cap) is applied to the spherical surface 36 or to the cylindrical surface 47.

However, there are cases in which such a sensitive system is unwarranted. Furthermore, there are cases where the layer thicknesses to be measured, from a statistical viewpoint, are distributed more densely around the intersection of curve 50 with straight line 51 than around the intersection of straight line 51 with curve 49. In these cases, as a result of coating the spherical surface 36 or the cylindrical surface 47, the curve 49 is shifted in the direction of curve 50 the more, the thicker the coating 32.

When using the probe tips in accordance with the present invention, in the system based on the German Utility Pat. No. 7,336,864, it is not necessary to principally alter the system described therein.

Figure 3:
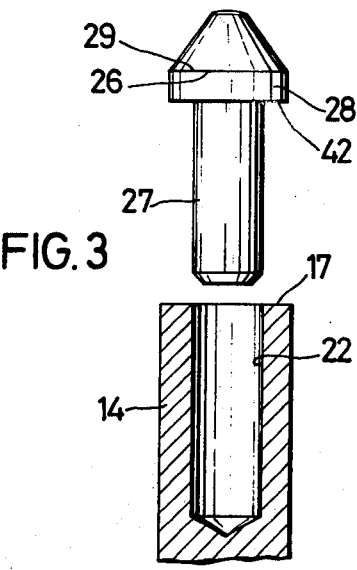
FIG. 3 is an enlarged view of a finished probe tip shortly before insertion.
Figure 4:
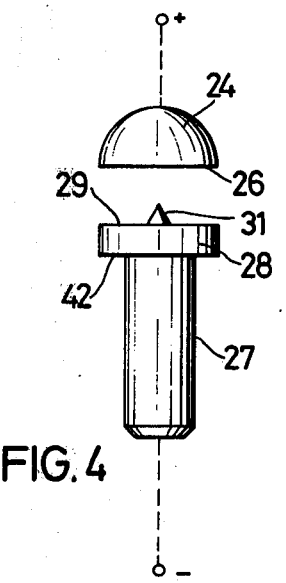
FIG. 4 shows the probe tip, still in two parts, before finishing.

In the embodiment, according to FIGS. 3 and 5, the outside surface 33 may, of course, be similar to surfaces 43, 45, 47, but axially symmetrical. In principle, the probe tip 37 may also have the form of an angled truncated cone. However, then manufacture is more difficult. The important thing is that the outside surface 33 does no bulge out from ground surface 26. Such a bulge results in a sphere. Rather, the outside surface 33 must be distinctly more slender than a spherical surface.

What is claimed is:

1. An interchangeable end piece for fastening to the front surfaces of a soft-iron magnetic yoke of a measuring probe which measuring probe is used for measuring the thickness of thin non-ferromagnetic layers on a ferromagnetic base, comprising
   a pin element having a headplate,
   a contact piece welded to the headplate which contact piece is made from a mass-produced, high-precision steel element having a contact surface with a single radius of curvature,
   the radial angle of the contact surface, measured from the center of the underside of the contact piece, is much smaller than 90°,
   the surface of the contact piece outside the radial angle range is depressed below the radius of curvature,
   the maximum surface described by the radial angle is much smaller than the cross-sectional area of the pin element at the underside of the headplate.

2. The end piece according to claim 1 wherein the contact piece can be a ball-bearing ball semi spherical section which is in the form of a circular cone outside the radial angle range.

3. The end piece, accoring to claim 1 wherein the contact piece can be half an axially cut cylinder with the surface outside the radial angle range being in the form of a wedge shape.

4. The end piece, according to claim 3 wherein the cylinder can be a roller-bearing cylinder.

5. The end piece according to claim 3 wherein the cylinder can be a precision rod.

6. The end piece accoding to claim 1 wherein the radial angle range has a gas diffusion layer of a hard, wear-resistant carbide which cannot be decomposed by water and diluted acids and which has a layer thickness of several microns.

7. The end piece according to claim 6 wherein the carbide is titanium carbide.

\* \* \* \* \*